United States Patent [19]

Sonnemaker

[11] Patent Number: 4,707,932
[45] Date of Patent: Nov. 24, 1987

[54] ICE FISHING APPARATUS

[76] Inventor: Frank F. Sonnemaker, Box 101, Sunburst, Mont. 59482

[21] Appl. No.: 15,426

[22] Filed: Feb. 17, 1987

[51] Int. Cl.⁴ .......................................... A01K 97/01
[52] U.S. Cl. ...................................................... 43/17
[58] Field of Search ................................ 43/15, 16, 17

[56] References Cited

U.S. PATENT DOCUMENTS

| | | |
|---|---|---|
| 2,451,693 | 10/1948 | Richards ................................ 43/17 |
| 2,788,602 | 4/1957 | Dzuba .................................... 43/17 |
| 2,936,541 | 5/1960 | Stanford ................................ 43/17 |
| 2,955,374 | 10/1960 | Matzo et al. ........................... 43/16 |
| 3,120,072 | 2/1964 | Rybarski ................................ 43/17 |
| 3,213,561 | 10/1965 | Roemer .................................. 43/17 |
| 3,230,655 | 1/1966 | Nomsen .................................. 43/17 |
| 3,888,035 | 6/1975 | Totten et al. ........................... 43/17 |
| 4,253,262 | 3/1981 | Johnson .................................. 43/17 |

Primary Examiner—M. Jordan

[57] ABSTRACT

Ice fishing apparatus include a body portion, a supporting portion, a line storing portion, a connecting portion, a displaying portion and a triggering portion. The body portion includes an elongated vertically oriented housing section with a lower cap member having a central opening and at least one drain opening. The supporting portion includes a plurality of leg members pivotally connected to the housing section. The connecting portion includes a shaft member disposed along the axis of the housing section and extending beyond the ends thereof. An elongated sleeve section surrounds the shaft member, the sleeve section extending from above the pivotal connection to adjacent the cap member. A water tight seal is disposed between the lower end of the sleeve section and the shaft member. The line storing portion includes a reel member affixed to the lower end of the shaft member. The displaying portion includes a wing section mounted on the shaft member above the housing section in a plane along the axis of the shaft member. The triggering portion includes a finger member extending outwardly from the housing section adjacent an upper end thereof with a transverse slot. An elongated spring member has a lower end connected to the housing section and an upper end selectively engageable with the transverse slot.

22 Claims, 6 Drawing Figures

ICE FISHING APPARATUS

This invention relates to a novel ice fishing apparatus and more particularly, relates to a unique ice fishing apparatus which minimizes loss of fish after they are hooked.

It is customary for an ice fisherman to fish a number of holes at the same time. Since the fisherman cannot personally attend all of his lines simultaneously, signal devices may be attached to each line to alert the fisherman when a fish has taken the hook on a particular line. Such devices, called "tip-ups", commonly utilize a movable arm or similar component so that when a fish pulls on a line attached to one end of the arm, the opposite end will be raised. A flag may be fastened to the end which is raised to attract the attention of the fisherman so he can hurry to the hole and pull on the line to set the hook in the fish's mouth to prevent the fish spitting out the hook.

However, a fish may be lost if the fisherman does not reach the line quickly. Unless the fisherman diligently watches his lines, he may not notice when the device is first tipped. Furthermore, such devices detract from a fisherman's enjoyment of the sport since it not only is boring to be required to direct one's full attention to the devices, but also it is difficult to concentrate on the devices for any extended period. Moreover, it is disappointing to lose a fish after it has taken a hook because of a delay in reaching the line and setting the hook.

Ice fishing tip-ups also have other shortcomings. The trigger may not be reliable. The trigger may trip before a fish has grasped the hook. Others may jam and not release at all.

Another problem is that parts which are required to move may have frozen and not function properly when a fish grasps the hook. This is particularly true for components that are located below the surface of the water. In addition to the possibility of freezing, exposure to the water also may corrode critical parts so the tip-up will not operate reliably.

From the above discussion, it is clear that past and present ice fishing devices do not meet the requirements of many fisherman. Thus, there is a need for a new apparatus which overcomes the deficiencies of previous devices.

The present invention provides a novel ice fishing apparatus which not only overcomes the shortcomings of earlier devices, but also provides features and advantages not found in previous devices. The apparatus of the invention functions even after being exposed to freezing for many hours. The trigger operates reliably and does not jam. Also, the critical components of the apparatus are corrosion proof. Furthermore, the apparatus provides a continuous signal to the fisherman so he does not have to constantly monitor his tip-ups.

The fishing apparatus of the invention is simple in design and can be produced relatively inexpensively. Commercially available materials and components can be utilized in its fabrication. Conventional manufacturing techniques and molding procedures can be employed by semi-skilled labor to produce the apparatus.

The ice fishing apparatus of the present invention can be used efficiently by persons of all ages and skills after a minimum of instruction. The apparatus can be adjusted to vary the force required to actuate the trigger and the drag on the line after the fish is hooked.

The apparatus is durable in construction and has a long useful life. Little, if any, maintenance is required to keep the apparatus in good working condition. The design of the apparatus can be modified to meet specific fishing requirements and conditions.

These and other advantages of the novel ice fishing apparatus of the present invention will be apparent from the following description and the accompanying drawings in which.

Figure 1:
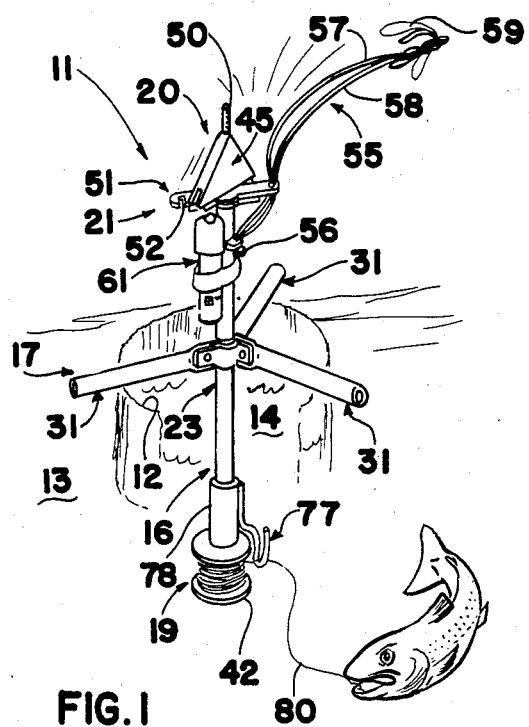
FIG. 1 is a view in perspective of one form of ice fishing apparatus of the invention in use.

As shown in the drawings, one form of ice fishing apparatus 11 of the present invention is positioned over an opening 12 cut in ice surface 13 of a body of water 14 such as a pond, lake, stream or similar waters. The ice fishing apparatus 11 of the invention includes a body portion 16, a supporting portion 17, a connecting portion 18, a line storing portion 19, a displaying portion 20 and a triggering portion 21.

The body portion 16 of the ice fishing apparatus 11 of the invention includes an elongated vertically oriented housing section 23. A cap member 24 is disposed over a lower end 25 of the housing section 23. The cap member 24 includes a central opening 26 and at least one drain opening 27, and advantageously a plurality of drain openings. The housing section 23 preferably is a tubular member 28 as shown.

Figure 2:
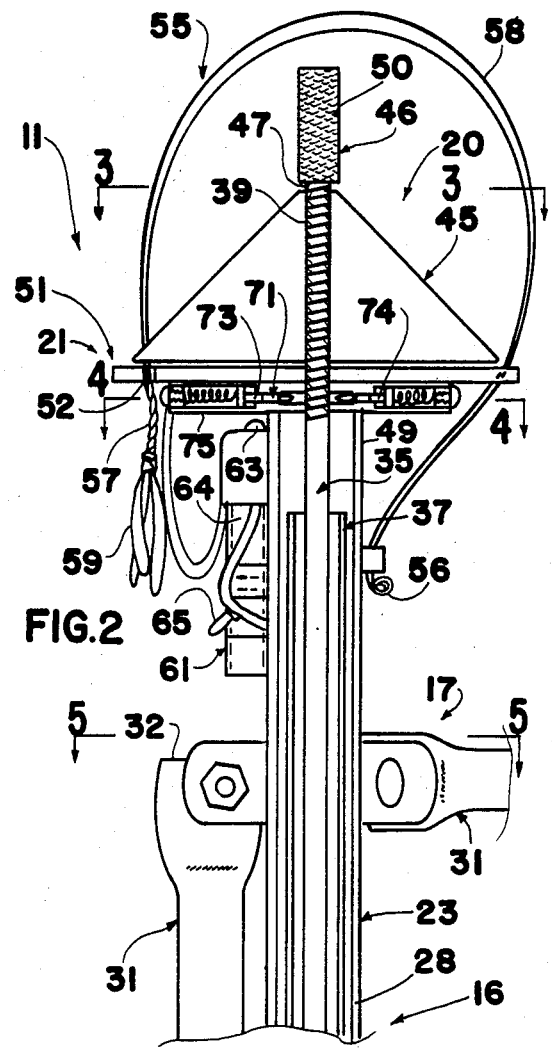
FIG. 2 is an enlarged side view in section of the ice fishing apparatus shown in FIG. 1.
Figure 3:
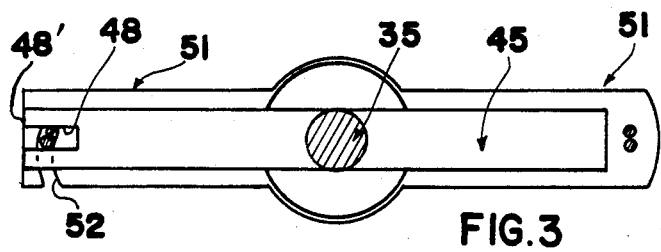
FIG. 3 is a sectional view of the ice fishing apparatus shown in FIG. 2 taken along line 3—3 thereof.
Figure 4:
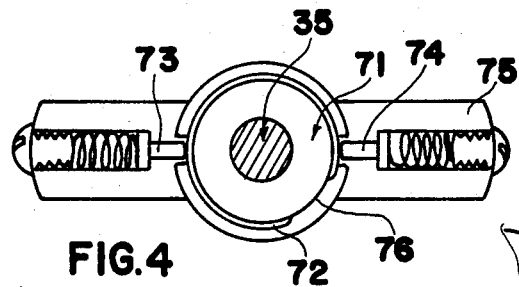
FIG. 4 is a sectional view of the ice fishing apparatus shown in FIG. 2 taken along line 4—4 thereof.
Figure 5:
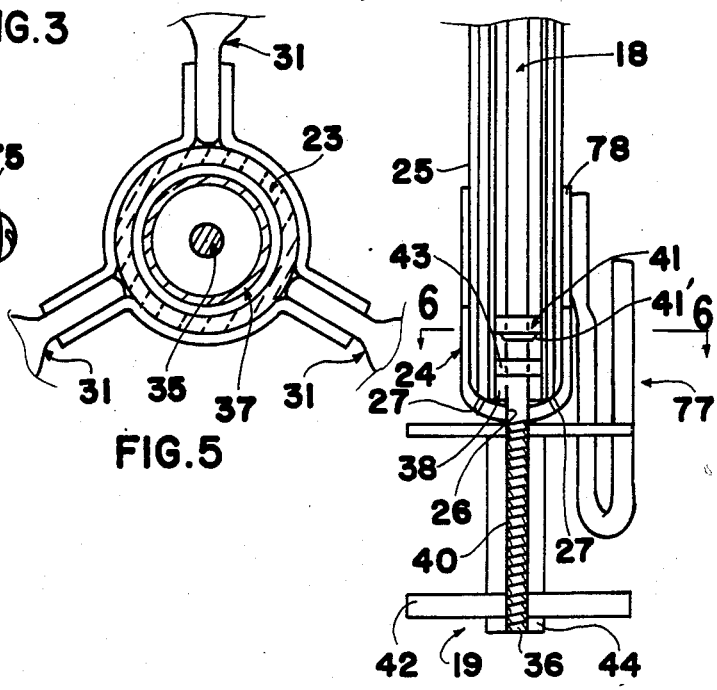
FIG. 5 is a sectional view of the ice fishing apparatus shown in FIG. 2 taken along line 5—5 thereof.
Figure 6:
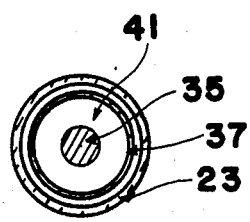
FIG. 6 is a sectional view of the ice fishing apparatus shown in FIG. 2 taken along line 6—6 thereof.

The supporting portion 17 of the ice fishing apparatus 11 includes a plurality of leg members 31. The leg members are pivotally connected to the housing section 23 intermediate its length. The leg members 31 are pivotable from positions generally parallel to the housing section to positions generally radial thereof in a common plane transverse to the housing section both of which are shown in FIG. 2.

The supporting portion advantageously includes three leg members equally spaced around the periphery of the housing section. The pivotal connection of the leg members to the housing section preferably includes stop members e.g. shoulders 32, for maintaining the radial position of the leg members.

The connecting portion 18 of the ice fishing apparatus 11 includes a shaft member 35. The shaft member 35 is disposed along the axis of the elongated housing section 23 and extends beyond the ends of the housing section. A lower end 36 of the shaft member extends through the central opening 26 of the cap member 24.

An elongated sleeve section 37 surrounds the shaft member. The sleeve section 37 extends from a point above the pivotal connection of the leg members 31 with the housing section to a point adjacent the cap member 24. A water tight seal is disposed between the lower end 38 of the sleeve section and the shaft member 35. Advantageously, the shaft member includes threaded end sections 39 and 40. The water tight seal may be a conventional seal such as an O-ring or more preferably, a seal member 41 that includes a flange section 41' biased toward the shaft such as a so-called "main seal" shown. Bearings 43 may be disposed at the upper and/or lower ends of the sleeve section 37.

The line storing portion 19 of the ice fishing apparatus 11 of the invention includes a reel member 42. The reel member 42 is affixed to the lower end 36 of the shaft member and is rotatable therewith. The reel member 42 advantageously is threadedly affixed to the shaft member 35. Preferably, a lock nut 44 is threaded onto the shaft member below the reel member.

The displaying portion 20 of the ice fishing apparatus 11 includes a wing section 45. The wing section 45 is mounted on the shaft member 35 above the housing section 23. The plane of the wing section 45 lies along the axis of the shaft member. A handle section 46 is affixed to an upper end 47 of the shaft member above the wing section 45.

The wing section advantageously is mounted symmetrically on the shaft member. The wing section preferably is threadedly affixed to the shaft member. The wing section advantageously includes a slot 48 along an edge 48' thereof as will be explained hereafter. At least part e.g. one major face preferably is a fluorescent color. The handle section 46 advantageously includes a knurled knob member 50.

The triggering portion 21 of the fishing apparatus 11 of the invention includes a finger member 51. The finger member 51 extends outwardly from the housing section 23 adjacent an upper end 49 of the housing section. The finger member extends beyond the outer edges of the wing section 45. A transverse slot 52 is located in the finger member 51 in a part thereof overlapping the wing section. The finger member preferably extends in opposite directions from the housing section.

The triggering portion 21 also includes an elongated spring member 55. The spring member 55 has a lower end 56 connected to the housing section 23 along the length thereof. An upper end 57 of the spring member is selectively engageable with the transverse slot 52.

The spring member advantageously includes an elongated wire member 58. The lower end of the wire member 58 is slideably connected to the housing section. The wire member 58 preferably includes a pair of closely adjacent parallel wires as shown in FIG. 2. Advantageously, a flag 59 is attached adjacent the upper end 57 of the spring member.

The ice fishing apparatus 11 of the present invention also may include other components and/or accessories to meet particular fishing requirements. For night fishing, the apparatus advantageously may include a light source 61. The light source 61 may include a container 62 mounted on the housing section 23 above the leg members 31.

As shown, light source 61 includes a lamp 63, batteries 64 and a switch 65. To provide a blinking light, leads 67 and 68 from the light source are connected through a control 69. The control includes a commutator 71 including a copper wire 72 wound around a substantial part of the periphery thereof. Brushes 73 and 74 are mounted in opposite sections of housing 75 that surrounds the commutator 71. The brushes are positioned so they are biased against the copper wire 72 on the periphery of the commutator.

The fishing apparatus of the invention also may include line guiding means shown as guide 77. The guide 77 which is open advantageously extends from housing section 23 to a point adjacent the reel member 42. Preferably, the open guide is slideably connected to the housing section such as with a collar 78.

The ice fishing apparatus of the present invention may be fabricated from commercially available materials and components. The apparatus can be constructed of a variety of materials such as metals, wood, plastics, combinations thereof and similar materials. Advantageously, the major components of the apparatus are formed of plastic and preferably substantially all of the components are formed of polyvinyl chloride. Components not formed of plastic advantageously are formed of corrosion proof or resistant materials such as stainless steel.

In the use of the ice fishing apparatus 11 of the present invention as shown in the drawings, spring member 55 is pulled upwardly along the housing section 23 to a fully extended position as shown in FIG. 1. A desired length of line 80 is pulled from reel member 42 and slipped over guide 77. Bait is placed on a hook at the free end of the line. The leg members 31 are pivoted from positions parallel to the housing section 23 to positions generally perpendicular thereto.

The tension or drag on the line is controlled by loosening or tightening the wing section on the upper part of shaft member 35 and the reel member 42 on the lower end of the shaft.

The free end of the spring member is inserted into the slot 52 in the end of the finger member 51. The pull on the line required to trip the spring 55 can be adjusted by the length of the spring member that is positioned below the slot. The apparatus 11 now is ready for use.

The fishing apparatus 11 is placed for fishing by inserting the lower end of housing section 23 and the reel member and line through the opening 12 and into the water 14. In this position, water enters drain openings 27 in the cap member 24 affixed to the lower end 25 of the housing section and rises therein to the water level.

Since main seal 41 covers the lower end of the sleeve section 37, the water can only rise between the sleeve section and the housing section but cannot enter the space between the sleeve section and the shaft member 35. The upper end of the sleeve section being above the leg members and thus above the water level does not allow water to enter the sleeve section from the top.

After the apparatus has remained in the water for an extended period of time, the water within the housing section may freeze but this does not adversely affect the operation of the apparatus. Ice in contact with the sleeve member 37 may prevent rotation thereof with the shaft member when a fish pulls line 80 from the reel member. However, the air space between the shaft member and the sleeve member allows the shaft member to rotate freely and insure normal operation of the apparatus.

Rotation of the shaft member as the fish pulls line from the reel member also rotates the wing section 45 affixed to the upper end of the shaft member. This rotation of the wing section pushes the end of the spring member disposed within the slot 52 of the finger section, freeing it so that the spring swings upwardly into an easily visible erect orientation. Continuous rotation of the wing member 45 also draws a fisherman's attention, particularly when the wing section is a fluorescent color.

When the fisherman observes the rotating wing section, he returns to the apparatus 11 and retrieves the fish. This can be accomplished by lifting the apparatus from the ice and pulling the line to the surface. After removing the fish, the apparatus can be reset by placing new bait on the line and inserting the end 57 of the spring member 55 into the slot 52 and positioning the apparatus over the ice opening 12 again with the leg members 31 resting on the ice surface 13.

For night fishing, a fisherman will actuate switch 65 on the light source 51 and rotate the shaft member 35 a part of a turn until the lamp 63 goes off before inserting the apparatus into the water. When a fish takes the bait and pulls on the line 80, shaft member 35 will rotate causing rotation of commutator 71 affixed thereto with respect to the brushes 73 and 74. With both brushes in contact with the wire 72 on the commutator, the lamp 63 will be lighted. However, when one of the brushes bears against the gap 76 in the wire 72, the circuit will be broken and the lamp will go out. Continuous rotation of the shaft will cause the lamp to blink and in this way catch the eye of the fisherman even if he is not monitoring the apparatus continually.

The above description and the accompanying drawings show that the present invention provides a novel ice fishing apparatus with features and advantages not found in earlier devices. The apparatus can be set easily and quickly even by persons with limited dexterity. Trigger release and line drag can be adjusted as desired. The presence of a fish on the line is easily observed even from a distance both during the day and after dark. The reel member can be replaced simply and conveniently.

The ice fishing apparatus of the invention is simple in design and can be produced from commercially available materials and components relatively inexpensively. The apparatus is durable in construction and corrosion proof. The apparatus has a long useful life with little, it any maintenance. It is light in weight and compact in size.

It will be apparent that various modifications can be made in the particular ice fishing apparatus described in detail above and shown in the drawings within the scope of the present invention. The size, configuration and arrangement of components can be changed to meet specific fishing conditions. Also, sand or other weight can be added to the leg members to provide greater stability in windy conditions. These and other changes can be made provided the functioning and operation of the ice fishing apparatus are not adversely affected. Therefore, the scope of the present invention is to be limited only by the following claims.

What is claimed is:

1. Ice fishing apparatus including a body portion, a supporting portion, a line storing portion, a connecting portion, a displaying portion and a triggering portion; said body portion including an elongated vertically oriented housing section, a cap member with a central opening and at least one drain opening therethrough disposed over a lower end of said housing section; said supporting portion including a plurality of leg members pivotally connected to said housing section intermediate its length, said leg members being pivotable from positions generally parallel to said housing section to positions generally radial thereof in a common transverse plane; said connecting portion including a shaft member disposed along the axis of said housing section and extending beyond the ends thereof, a lower end of said shaft member extending through said central opening in said cap member, an elongated sleeve section surrounding said shaft member, said sleeve section extending from a point above said pivotal connection of said leg members with said housing section to a point adjacent to said cap member, a water tight seal disposed between said lower end of said sleeve section and said shaft member; said line storing portion including a reel member affixed to said lower end of said shaft member and rotatable therewith; said displaying portion including a wing section mounted on said shaft member above said housing section, the plane of said wing section lying along the axis of said shaft member, a handle section affixed to an upper end of said shaft member above said wing member; said triggering portion including a finger member extending outwardly from said housing section adjacent an upper end thereof, a transverse slot in said finger member in a part thereof overlapping said wing section, an elongated spring member having a lower end connected to said housing section along the length thereof, an upper end of said spring member being selectively engageable with said transverse slot; whereby positioning said fishing apparatus in an opening cut through a layer of ice on the surface of a body of water with said leg members resting on the ice surface and said spring member engaging said slot in said finger member, a fish taking bait on the end of a line extending from said reel member will draw line from said reel member thereby rotating said shaft member affixed thereto and causing said wing section on the upper end of said shaft member also to rotate and push said spring member from said slot causing said spring member to move upwardly so that said rotating wing section and said upwardly extending spring member signal a fisherman that a fish has been caught.

2. Ice fishing apparatus according to claim 1 wherein said housing section is a tubular member.

3. Ice fishing apparatus according to claim 1 wherein said supporting portion includes three leg members equally spaced around the periphery of said housing section.

4. Ice fishing apparatus according to claim 1 wherein said pivotal connection of said leg members to said housing section includes stop means maintaining said radial position thereof.

5. Ice fishing apparatus according to claim 1 wherein said shaft member includes threaded end sections.

6. Ice fishing apparatus according to claim 1 wherein said reel member is threadedly affixed to said shaft member.

7. Ice fishing apparatus according to claim 1 wherein said water tight seal between said shaft member and said sleeve section includes a flange section biased toward said shaft member.

8. Ice fishing apparatus according to claim 1 wherein said wing section is symmetrically mounted on said shaft member.

9. Ice fishing apparatus according to claim 1 wherein said wing section is threadedly affixed to said shaft member.

10. Ice fishing apparatus according to claim 1 wherein said wing section includes a slot in an edge thereof.

11. Ice fishing apparatus according to claim 1 wherein said handle section includes a knurled knob member.

12. Ice fishing apparatus according to claim 1 wherein said finger member extends in opposite directions from said housing section.

13. Ice fishing apparatus according to claim 1 wherein said spring member includes an elongated wire member, the lower end of which is slideably connected to said housing section.

14. Ice fishing apparatus according to claim 1 wherein said wire member includes a pair of closely adjacent parallel wires.

15. Ice fishing apparatus according to claim 1 including a line guide extending from said housing section to a point adjacent said reel member.

16. Ice fishing apparatus according to claim 1 wherein said line guide is an open guide slideably connected to said housing section.

17. Ice fishing apparatus according to claim 1 wherein an upper end of said spring member includes a flag.

18. Ice fishing apparatus according to claim 1 including a lock nut threaded onto the lower end of said shaft member below said reel member.

19. Ice fishing apparatus according to claim 1 wherein major components of said apparatus are formed of plastic.

20. Ice fishing apparatus according to claim 1 including a light source mounted on an upper section of said housing section actuatable by rotation of said shaft member.

21. Ice fishing apparatus according to claim 20 wherein said light source is actuated intermittently by rotation of said shaft member.

22. Ice fishing apparatus according to claim 1 wherein a major face of said wing section is a fluorescent color.

* * * * *